(12) United States Patent
Nazri et al.

(10) Patent No.: US 8,021,533 B2
(45) Date of Patent: Sep. 20, 2011

(54) PREPARATION OF HYDROGEN STORAGE MATERIALS

(75) Inventors: Gholam-Abbas Nazri, Bloomfield Hills, MI (US); Luc M. A. Aymard, Amiens (FR); Yassine Oumellal, Amiens (FR); Aline Dominique Rougier, Amiens (FR); Jean-Marie Tarascon, Amiens (FR)

(73) Assignees: GM Global Technology Operations LLC, Detroit, MI (US); Universite de Picardie, Jules Verne, Amiens (FR)

( * ) Notice: Subject to any disclaimer, the term of this patent is extended or adjusted under 35 U.S.C. 154(b) by 973 days.

(21) Appl. No.: 11/943,050

(22) Filed: Nov. 20, 2007

(65) Prior Publication Data

US 2009/0127129 A1 May 21, 2009

(51) Int. Cl.
*C25D 1/00* (2006.01)
*H01M 6/00* (2006.01)
(52) U.S. Cl. ............... 205/59; 205/477; 29/623.1
(58) Field of Classification Search .......... 205/59, 205/477; 29/623.1
See application file for complete search history.

(56) References Cited

U.S. PATENT DOCUMENTS

| 5,560,752 A | * | 10/1996 | Badding et al. ............ 29/623.1 |
| 6,572,836 B1 | | 6/2003 | Schulz et al. |
| 2006/0013753 A1 | | 1/2006 | Vajo et al. |

FOREIGN PATENT DOCUMENTS

| WO | 9738458 | 10/1997 |
| WO | 2006005892 | 1/2006 |

OTHER PUBLICATIONS

Written Opinion of the International Searching Authority for Application No. PCT/US2008/080283 dated May 27, 2009.
International Search Report for Application No. PCT/US2008/080283 dated May 27, 2009.

* cited by examiner

*Primary Examiner* — Luan V Van
(74) *Attorney, Agent, or Firm* — Reising Ethington P.C.

(57) ABSTRACT

A candidate hydrogen storage material, M, capable of reaction with hydrogen to form a hydride, MHm (m=number of H atoms per formula unit), and to subsequently release hydrogen on demand, is processed electrochemically to enhance its absorption/desorption properties. For example, a magnesium hydride ($MgH_2$) composition, arranged as a positive electrode, is reduced with lithium ions in a direct current electrolytic cell to form nanometer-size particles of magnesium (and lithium hydride). The cell operation may be reversed to oxidize magnesium to nanometer size particles of magnesium hydride. Thereafter, the nanometer-size particles of M/MHm adsorb and desorb hydrogen at higher yields and under more moderate storage processing conditions.

20 Claims, 7 Drawing Sheets

PREPARATION OF HYDROGEN STORAGE MATERIALS

TECHNICAL FIELD

This invention pertains to methods for treating metal hydride containing materials to facilitate hydrogen storage and removal. More specifically, this invention pertains to practices using an electrochemical method for preparing nanometer-size, hydride-containing compositions for more usable and accessible hydrogen storage.

BACKGROUND OF THE INVENTION

Hydrogen fuel cells and other hydrogen-consuming devices require a material medium that will readily absorb hydrogen for temporary storage and later release hydrogen upon demand of the hydrogen-fueled device. There is a need for a storage medium to which hydrogen gas may be added and withdrawn under moderate processing conditions. The need is particularly acute where the hydrogen-consuming device is used on a passenger or commercial vehicle to power it.

Various materials, such as metal hydride compositions, have been proposed to store and release hydrogen. Magnesium, for example, has a relatively high theoretical storage capacity (7.6% hydrogen at 300° C.) as $MgH_2$, but the $Mg/MgH_2$ combination may not presently be used for fuel cells because of its low sorption kinetics and its desorption temperature of about 350° C. These temperatures are perceived as being too high for vehicle applications. Hydrogen absorption and desorption temperatures of the order of 80° C. to 150° C. or lower are desired for many hydrogen storage applications.

Other magnesium-based hydride materials have been proposed, including magnesium-nickel alloys (with and without palladium catalyst particles), $Mg$—$Nb_2O_5$ composites, and others. But these other potential hydride materials present like impediments for hydrogen storage applications or provide low yields of hydrogen.

It is an object of this invention to provide a method of preparing hydride-materials for storage and release of hydrogen under more moderate conditions.

SUMMARY OF THE INVENTION

Many chemical elements, combinations of elements and alloys (M) are known to react with hydrogen to form one or more hydride compounds ($MH_m$) where m is an integer indicating the number of hydrogen atoms associated with M in the formula representation of a specific hydride composition. For example, magnesium forms a dihydride, $MgH_2$. Hydrides are formable with many material alloys and inter-elemental compounds and M is used in this specification to include such hydride forming elements and combinations of elements. Similarly, m indicates the number of hydrogen atoms included in an empirical formula designation, $MH_m$, of such a hydrogen containing material.

$MH_m$ will be selected and prepared for use as an active agent for release of hydrogen under suitable conditions of temperature and pressure in which some or all of the initial hydrogen content of $MH_m$ may be released and used. For example, in a fuel cell-powered vehicle application, $MH_m$ containing material may be stored in a suitable on-vehicle container adapted to expel hydrogen from the material on vehicle demand and deliver the hydrogen to the fuel cell. Following removal of accessible hydrogen from $MH_m$ the residual material may be subjected to processing for re-absorption of hydrogen in the on-vehicle vessel or at another suitable location. It is found that the removal of hydrogen from a candidate $MH_m$ material and re-absorption of hydrogen into the material is quite dependent on the particle size of the $MH_m$.

In accordance with embodiments of the invention, a hydrogen containing material, $MH_m$, is prepared in particulate form by any suitable process. Depending upon the specific method of preparation the $MH_m$ will have a characteristic dimension (e.g., the radius of spherical particles) which will likely be in the micrometer size range or larger. This invention provides electrochemical processes for rapidly and effectively converting the $MH_m$ material to nanometer size for faster release and re-absorption of hydrogen under more moderate processing conditions.

A selected $MH_m$ (e.g., $MgH_2$) may optionally be mixed, for example, with electrically conductive carbon particles and with particles of a suitable polymeric binder composition for applying the $MH_m$-containing mixture to a conductive plate which will serve as a positive electrode in an electrolytic cell. The electrode material is suitably porous for electrochemical reaction with the $MH_m$ component of the electrode material. A negative electrode material is specified having a lower Gibbs free enthalpy of formation (kJ/mol of H) than the specified $MH_m$. In many embodiments, lithium will serve as a negative electrode material because it is effective for the electrochemical processing of many $MH_m$ compositions. An electrolyte is selected for transport of the negative electrode metal into the positive electrode and for the reduction in $MH_m$ to M and, for example, lithium hydride. Where lithium is the specified negative electrode material, lithium hexafluorophosphate may, for example, be used as a lithium ion source/mediator in a suitable nonaqueous electrolyte liquid.

A direct electrical current is used in operation of the electrolytic cell in the reduction of $MH_m$ to M and the formation of a second hydride, such as lithium hydride. An important feature of this electrochemical process is that the particles of the M material are now of nanometer size and much more amenable to re-absorption of hydrogen. The resulting nanometer size particles typically release and re-absorb more of their potential hydrogen content than their larger precursors. And the nanometer size particles produced by this invention absorb and release hydrogen under more moderate processing conditions.

In one embodiment of the invention, the nanometric M particles may be removed from the processed electrode material and used as a hydrogen absorbing material in a hydrogen storage medium and vessel. In another embodiment of the invention, the polarity of the electrochemical cell may be reversed to re-oxidize M to $MH_m$ material. The hydrogen-containing $MH_m$ is still of nanometer size and may be separated from its electrode material to serve as a re-cycle-able hydrogen releasing material from a hydrogen storage apparatus.

Other objects and advantages of the invention will be apparent from a description of illustrative embodiments of the invention. In the description of this illustrative embodiments reference will be made to drawing figures which are described in the following section of this specification.

DESCRIPTION OF PREFERRED EMBODIMENTS

Figure 1:
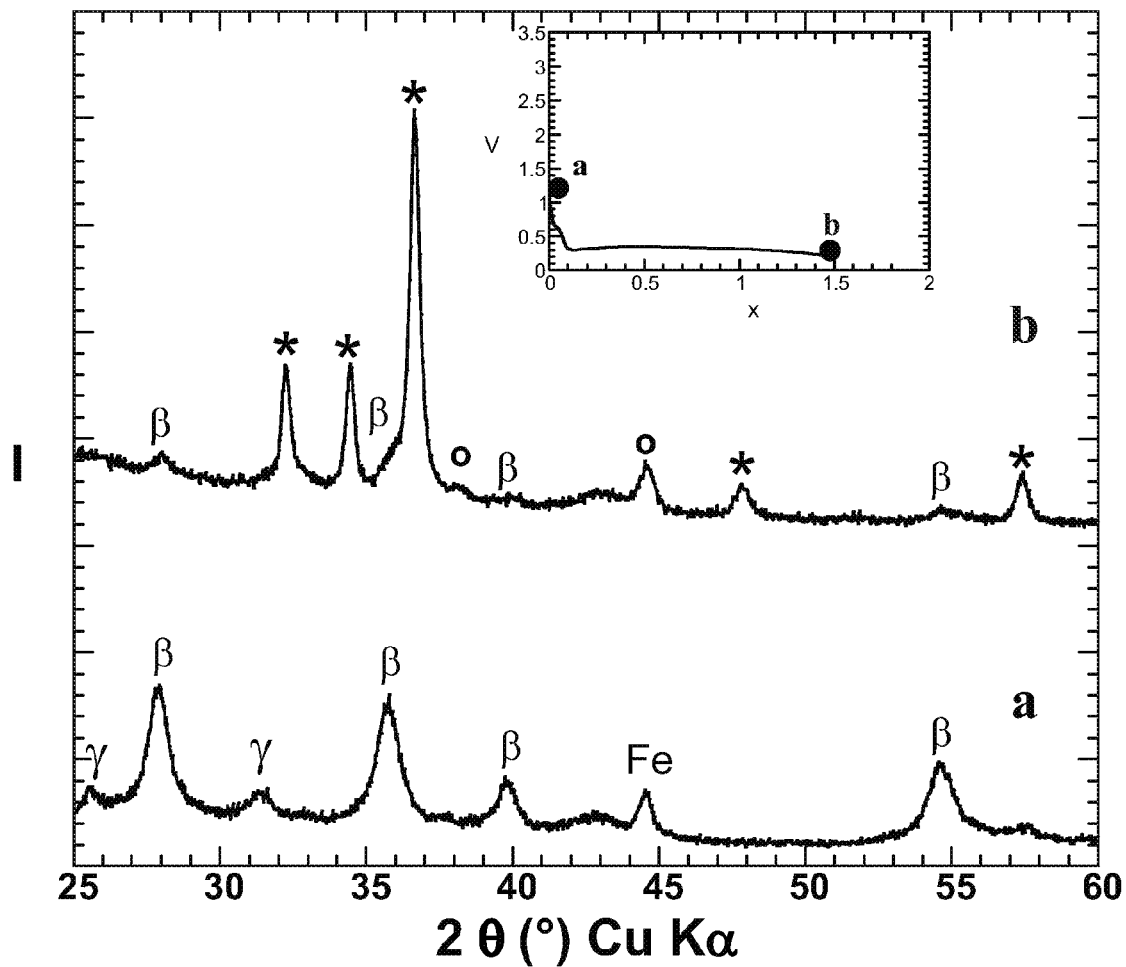
FIG. 1 presents two X-ray diffraction patterns (a and b) as diffraction intensity, I, in relative units versus two-theta angle in degrees for copper Kα radiation. Diffraction pattern a was produced from a starting positive electrode composition of MgH$_2$ and electrically conductive carbon used in Example 1. Pattern b was obtained from the positive electrode material after three-quarters of the MgH$_2$ was reduced to Mg and LiH was formed electrochemically when lithium was inserted into the electrode. The smaller inserted graph in FIG. 1 traces electrochemical potential, V, versus x as the electrochemical reduction progressed.

In accordance with embodiments of this invention, certain material formulations comprising hydride compositions and their precursor elements are processed electrochemically to form nanometer size particles (sometimes termed herein "nanometric" particles) that permit the absorption and release of hydrogen under moderate processing conditions. Materials produced in practices of the present invention comprise nanometric particles comprising an element M and/or an M hydride. The materials may also contain LiH, optionally a M-Li alloy, and optionally an electrically conducting (electron conduction) material such as a conductive carbon. In some embodiments, the nanometric particles may be bound together by a polymer.

The following nomenclature is used in illustrating embodiments and practices of the invention:

"Nanoparticles" or "nanometric particles" means particles having a size ranging between 1 and 100 nm. Here size may refer to a diameter of a spherical particle or to a major dimension of some other particle shape.

"M hydride" means an element M in which hydrogen atoms are absorbed (for example, chemically combined). M hydride is often designated hereafter MH$_m$, where m is the number of H atoms absorbed or combined by M.

M designates a single element or several elements (in a mixture, intermetallic compound, or an alloy form) chosen from metals or semi-metals able to form a hydride, with a free enthalpy of formation per H which is higher than that of LiH.

Alkali metals (Na, K, Rb, Cs), alkaline earth metals (Mg, Ca, Ba, Sr), elements from the IIIA group (such as B, Al, Ga, Sb), from the IVA group (such as C, Si, Ge, Sn), and from the VA group (N, P, As) may be mentioned as examples of metals or semi-metals. Further examples are intermetallic compounds AB$_n$, in which A represents one or more element(s) able to form a stable hydride and B is an element forming an instable hydride. Examples of intermetallic compounds are given in the table below:

| A | B | n | AB$_n$ |
|---|---|---|---|
| Mg, Zr | Ni, Fe, Co | ½ | Mg$_2$Ni, Mg$_2$Co, Zr$_2$Fe |
| Ti, Zr, | Ni, Fe | 1 | TiNi, TiFe, ZrNi |
| La, Zr, Ti, Y, Ln | V, Cr, Mn, Fe, Ni | 2 | LaNi$_2$, YNi$_2$, YMn$_2$, ZrCr$_2$, ZrMn$_2$, ZrV$_2$, TiMn$_2$ |
| La, Ln, Y, Mg | Ni, Co | 3 | LnCo$_3$, YNi$_3$, LaMg$_2$Ni$_9$ |
| La, rare earths | Ni, Cu, Co, Pt | 5 | LaNi$_5$, LaCo$_5$, LaCu$_5$, LaPt$_5$ |

Further examples are the intermetallic compounds in which part of sites A and/or sites B are substituted with another element. For instance, if M represents LaNi$_5$, the intermetallic alloy may be noted LaNi$_{5-x}$A$_x$, where A is, for example, Al, Cu, Fe, Mn, and/or Co, and La may be substituted with Mischmetal. Mischmetal means a mixture of rare earth metals containing 30% to 70% of cerium, neodymium and very small amounts of elements from the same series, the remainder being lanthanum.

The electronic conducting material may be a carbonaceous conductor or a metal conductor. The carbonaceous electronic conducting material may be Carbon black Vulmay P® commercialized by Cabot Corporation (USA), MCMB 2528®, graphite F399®, coke, Ketjen Black®, mesoporous or microporous carbon, graphite, and disordered carbon. The metal electronic conductor may be an element or a mixture of elements chosen from transition metals such as V, Cr, Ti, Cu, Ni, Fe, Co or Nb and noble metals such as Ag or Pd. The metal electronic conductor may be an added additive or may constitute an element from an intermetallic compound forming M.

The polymer is useful as a binder. The polymer may be chosen from:

solvating polymers such as polyoxyalkylenes, in particular polyoxyethylene.

non solvating polymers, in particular poly(tetrafluoro-ethylene) PTFE, poly(vinyl chloride) PVC, poly(ethylene-propylene-diene monomer) EPDM, poly(vinylidene fluoride) PVDF, poly(vinylidene hexafluoropropylene fluoride) PVDF-HFP, or carboxymethylcellulose CMC.

A further object and practice of the invention is the preparation of the nanometric material. Practices of the method aspect of the invention may be characterized in that they are performed in an electrochemical cell. The positive electrode of the cell comprises, as the active material, M hydride, or a mixture of M and LiH, or a mixture of M, LiH and M Hydride. The negative electrode is suitably and preferably a Li-containing electrode and the electrolyte is a solution of a Li salt such as lithium hexafluorophosphate, LiF$_6$P. The nanometric particles for hydrogen storage are typically formed during the first charge or discharge of the cell. The average nanometric particle size decreases as the cycling rate increases.

The element M and the M hydride that are used as starting products may be selected from commercially available products. The mixture of M and of lithium hydride may be prepared by conventional methods, for example by high-energy grinding of a mixture of Li and the M hydride, $MH_m$. The M hydride may be prepared by solid-gas reaction or by grinding M under a hydrogen atmosphere.

The material forming the positive electrode of the electrochemical cell used for the process may further contain a compound which confers electronic conduction, and a polymer acting as a binder. Both the materials conferring electronic conductivity and the polymer may be chosen from those constituents previously described.

In a first step, the process according to the invention may be used to prepare a material (M) having low hydrogen content but nanometer scale particle size. The process comprises the operation of an electrochemical cell and is further characterized in that the active material of the positive electrode is the hydride $MH_m$. During the first discharge of the cell, a direct current is applied in order to induce the reaction:

$$MH_m + xLi^+ + xe^- \rightarrow xLiH + (x/m)M + [1-(x/m)]MH_m, \quad (I)$$

in which m is the number of H atoms absorbed by metal M and x is the number of Li ions involved in the reaction.

After this first discharge step the electrochemical cell is dismantled and the material which formed the positive electrode and which is now constituted by the metal M, optionally LiH and optionally MHm is recovered.

In another embodiment, any LiH formed during the first discharge step may be removed from the positive electrode material by selective dissolution in an organic compound. For example, dissolution of LiH may be obtained by reaction with triethylaminoborane ($Et_3N$—B) soluble in THF, according to the following reaction scheme:

$$N(C_2H_5)_3B + LiH = N(C_2H_5)_3BH^-Li^+.$$

If during the discharge step (Reaction I) x=m, the change of $MH_m$ into M is complete. If x<m, a mixture of M and $MH_m$ is obtained. An excess of Li(x>m) may provide Li needed for Li-M alloy formation.

Particles of M and $MH_m$ formed in the discharge reaction of the electrolytic cell are typically of nanometer size. Confirmation of the size of the M and $MH_m$ particles may be obtained by transmission electronic microscopy.

In another embodiment of the invention, the electrochemical process may now be reversed and used to prepare a material ($MH_m$) with a relatively high $H_2$ content. It is characterized in that:

a) the active material of the positive electrode is a mixture of M and LiH b) for the $1^{st}$ charge of the cell, a current is applied in order to induce the reaction $$M + xLiH \rightarrow x/mMH_m + 1-(x/m)M + xLi^+ + xe^-, \quad (II)$$

in which m is the number of H atoms absorbed by metal M and x the number of Li ions implied in the reaction;

c) the electrochemical cell is dismantled and the material of the positive electrode containing $MH_m$, and optionally M and LiH, or M is recovered.

If x=m, the transformation from M into $MH_m$ is complete. If x<m, a mixture of M and $MH_m$ is obtained.

It is preferred that the M and LiH mixture, initially constituting the active material of the positive electrode, is finely divided. In one embodiment this finely divided mixture may be obtained by a mixing and grinding operation during which a chemical reaction may occur. In another embodiment the active material may also be obtained electrochemically, as described above, from $MH_m$ used as the active material of a positive electrode in an electrochemical cell, in which the negative electrode is Li and the electrolyte is a lithium salt. During the $1^{st}$ discharge, a material containing M and optionally LiH and optionally $MH_m$, is obtained according to the above mentioned reaction (I).

The material of the invention, nanometric $MH_m$, is particularly useful for hydrogen storage. This is because the nanometric nature of the $MH_m$, favors hydrogen sorption. Hydrogen release and re-absorption capacity values of nanometric $MH_m$ are closer to the theoretical values. Such higher capacity values may be obtained after the first electrochemical absorption/desorption cycle and at temperatures which are lower than those required for prior art materials which are not nanometric.

This hydrogen absorption capacity $C_A$ depends on the nature of the element M. The weight capacity $C_A$ in % of a compound M giving $MH_m$ hydride is calculated according to the formula $C_A = (m/M_{MHm})*100$, where m is the number of hydrogen atoms that may be absorbed by M, and $M_{MHm}$ is the molar mass of the hydride $MH_m$. For instance, the weight capacity of Mg is $(2/26.3)*100=7.6\%$. For an element M of ABn-type, it is generally in the order of 1.5%.

According to the invention, when a material contains an electronic conductor and or a binder, the capacity value of the material is proportional to the content of element M in the mixture.

Preferably, according to the invention, a material intended for hydrogen storage has a value of "m" that is high enough to provide a hydrogen absorption capacity of at least 1.5% by weight.

When a material according to the invention contains an electronic conductor, the content of electronic conductor is preferably below 40% by weight of the overall storage composition.

When the material according to the invention contains a polymer acting as a binder, the polymer content is preferably lower than 10% by weight of the overall storage composition.

The M content required to obtain a specific absorption capacity is determined from amounts of reactants involved in reaction (I) and from the atomic mass of the implied elements.

Some examples of determination of hydrogen storage capacity are given below.

When a material according to the invention contains Mg, LiH and carbon, and is obtained electrochemically from a cathode material containing 26.3 g of $MgH_2$ and 10.52 g of C, according to the reaction $MgH_2 + 2Li^+ + 2e^- \rightarrow 2LiH + Mg$, Mg mass content is 47.8% and the weight absorption capacity of hydrogen is $(47.8*7.6)/100$, i.e. 3.8%. When the reaction is $MgH_2 + 1.5Li^+ + 1.5e^- \rightarrow 1.5LiH + 0.75Mg + 0.25\ MgH_2$, and all other conditions being identical, the material according to the invention has a Mg mass content of 38.5% and a weight absorption capacity of hydrogen of $(38.5*7.6)/100$, i.e. 2.9%. In both cases, the weight capacity is interesting for hydrogen storage.

When a material according to the invention is obtained electrochemically using a positive electrode material containing $AB_5H_5$ and 20% in weight of carbon, according to the following reaction $AB_5H_5 + 5Li^+ + 5e^- \rightarrow 5LiH + AB_5$, the $AB_5$ mass content of this material is 77% and the mass absorption capacity of $H_2$ is $(77*1.5)/100$, that is to say 1.16%.

Hydrogen storage consists of an absorption step when a source of hydrogen is available and a desorption step to release hydrogen at a given temperature and pressure.

Hydrogen absorption is carried out with a material having a high M content. Hydrogen absorption is carried out submitting the material to an hydrogen flow at appropriate pressure and temperature. Pressure must be higher than the equilibrium pressure of the hydride at the chosen temperature. The appropriate temperature and pressure depend on M, and may be determined by a person with ordinary skill in the art.

Desorption of the material is performed by submitting the material which contains hydrogen to an appropriate temperature and an appropriate pressure. Pressure must be lower than the equilibrium pressure of the hydride at the chosen temperature.

For instance, if $MH_m$ is $MgH_2$, the thermal treatment for the desorption is carried out at a temperature in the order of 200° C. (definitely lower than the temperature of 250-300° C. required for a non nanometric $MgH_2$-based material).

For other hydrides, the thermal treatment may generally be carried out at a temperature lower than or equal to 300° C.

As stated, the material of the invention may contain a polymer acting as a binder and/or an electronic conductor additive. The binder and or electrical conductor may, for example, be mixed as particles with the original electrode material, or, for example, coated or otherwise applied over particulate electrode material previously attached to an electrode body or plate. The presence of the binder and/or the electronic conductor also serves to prevent M or $MH_m$ particles from agglomerating during the successive cycles of $H_2$ absorption-desorption. This facilitates keeping the nanometric size of the particles. A further additive may optionally be added in order to prevent particle growth. This additive may be a metal (for instance, one of the metals previously mentioned as being electronic conductor), a metal oxide (e.g., $Nb_2O_5$, $Fe_2O_3$, and $V_2O_5$), a fluoride ($NbF_5$), or carbon.

The following examples will explain further illustrate embodiments of the present invention. They are given as examples and do not constitute limitations of the invention.

EXAMPLE 1

Preparation of Nanometric Particles

An electrochemical cell was built, in which the positive electrode was made of a mixture of, by weight, 80% $MgH_2$ having a particle size between 10 and 50 μm and 20% C, compacted as a porous conductive layer on a soft Ni disk. The electrolyte was a 1M solution of lithium hexafluorophosphate ($LiPF_6$) in a 50/50 vol. mixture of ethyl carbonate and dimethyl carbonate. The negative electrode was constituted of metal Li on a Ni disk.

The cell was subjected to a steady discharge current of C/10 for a time to obtain a value of x=1.5 in the reaction:

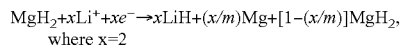
where x=2

In this electrochemical reaction, lithium was transported from the negative electrode (anode) to the cathodic positive electrode where it reacts with metal hydride anode material ($MgH_2$) to form LiH. The plateau potential of this reaction was measured at about 350 mV for the discharge regime of C/10. The potential of the cell during this discharge reaction (from starting material a in the positive electrode to state of the starting material when the reaction was stopped at b) is presented in the inserted graph of V versus. x in FIG. 1. Such an electrochemical activation may be done either in a galvanostatic mode (using either constant current or pulse current) or potentiostatically. The size of the obtained nanometric magnesium particles was found to change only slightly as the applied current was varied. However, it was observed that the yield of the particle conversion reaction is a function of the applied current and higher yields were obtained for currents smaller than C/5 (in which C represents the current value for depositing one gram-mole of Li in five hours).

The material of the positive electrode was recovered from the cell when x reached 1.5. It consisted of a mixture of nanometric particles containing 0.75 Mg, 0.25 $MgH_2$ and 1.5 LiH, and carbon.

FIG. 1 represents the XRD patterns of the starting material (a) and after the first discharge limited to x=1.5 (b). The peaks denoted *, β, γ and ° correspond to Mg, β-$MgH_2$, γ-$MgH_2$, and LiH, respectively. The inserted electrochemical curve shows the evolution of potential V (vs. Li$^+$/Li, in volts) as a function of x. The Fe peak at about 44.5° 2θ in curve a is attributed to the use of steel balls in ball milling of the starting material.

The data of FIG. 1 confirmed the presence of $MgH_2$ (as β and γ crystal phases) in the starting positive electrode material, and the formation of LiH and Mg during the 1$^{st}$ discharge.

The particle size of the $MgH_2$, Mg and LiH determined by TEM is between 30 nm and 50 nm.

Hydrogen Absorption on Nanometric Particles

The powder removed from the positive electrode after the reduction of three-quarters of the $MgH_2$ to Mg was subjected to a thermal treatment at 100° C., under a hydrogen pressure of 10 bars for 1 hour.

Figure 2:
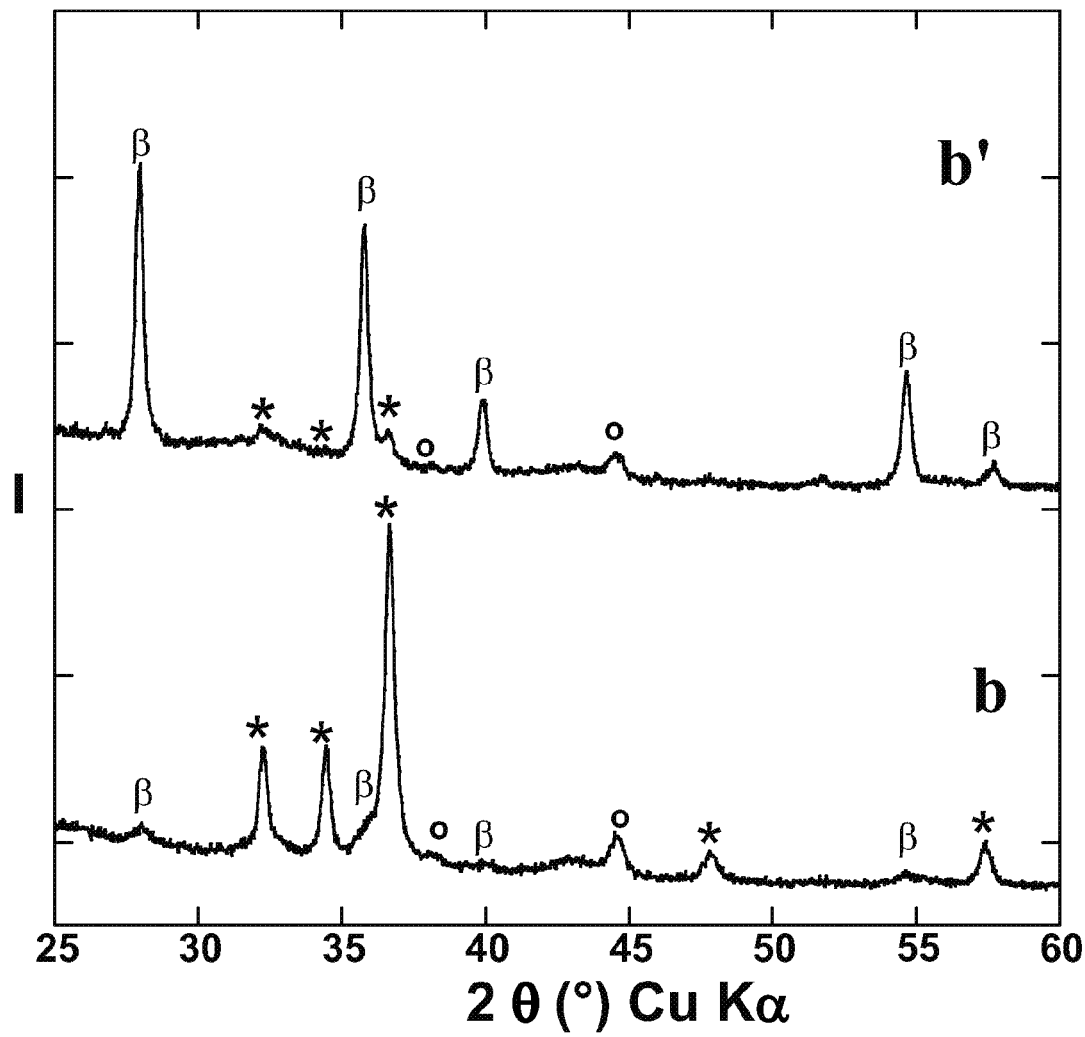
FIG. 2 presents two X-ray patterns (b and b') obtained on removed positive electrode material (Example 1) before (b) and after (b') hydrogen absorption by the nanometric magnesium particles.

FIG. 2 represents the X ray diffraction patterns obtained before (b) and after (b') hydrogen absorption by the Mg nanometric particles. I represents the intensity of the signal. The peaks denoted *, β and °, correspond to Mg, β-$MgH_2$, and LiH, respectively. The obtained material was analyzed by XRD and it shows that a rate of hydrogen absorption higher than or equal to 95% is reached with a temperature of 100° C. The rate was calculated from the area of the diffraction peaks of 100% intensity of $MgH_2$ and Mg.

Hydrogen Desorption

The hydrogen-rich material obtained during the previous step was subjected to a thermal treatment at 200° C. under primary vacuum for 5 hours. XRD analysis was performed on the obtained material and the result shows a rate of hydrogen desorption higher than 95%.

EXAMPLE 2

Preparation of $MgH_2$ Nanometric Particles

The method of example 1 was used to prepare Mg nanometric particles on the positive electrode of the electrochemical cell. Then, instead of recovering the material obtained at the positive electrode at the end of the 1$^{st}$ discharge, a following reverse polarity charge at a C/10 regime was performed until a value of x=0.4 was reached in the above formula (II).

Figure 3:
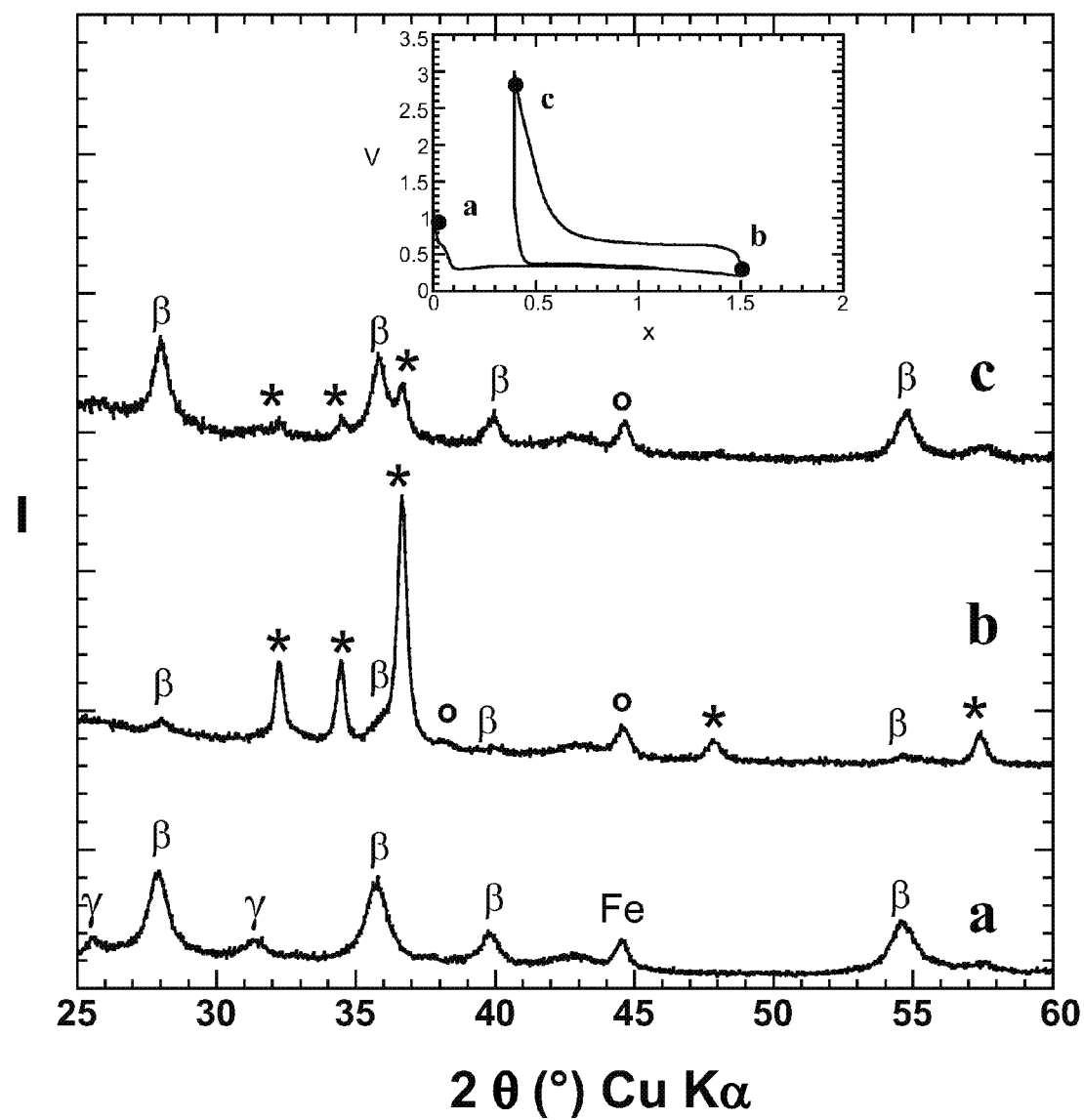
FIG. 3 presents XRD patterns at various stages of Example 2 reactions, i.e. for different values of x. X-ray patterns a, b, and c correspond to x=0 (starting electrode material), x=1.5 (end of 1$^{st}$ discharge), and x=0.4 (end of 1$^{st}$ charge), respectively. The peaks denoted *, β, γ and ° correspond to Mg, β-MgH$_2$, γ-MgH$_2$, and Li, respectively. The Fe peak in pattern a is attributed to iron introduced into the material during ball milling. The inserted electrochemical curve shows the evolution of potential V (vs. Li$^+$/Li, in volts) as a function of x.

FIG. 3 represents the XRD patterns at various stages of the reaction, i.e. for different values of x. X-ray patterns a, b, and c correspond to x=0 (starting electrode material), x=1.5 (end of 1$^{st}$ discharge), and x=0.4 (end of 1$^{st}$ charge), respectively. The peaks denoted *, β, γ and ° correspond to Mg, β-$MgH_2$, γ-$MgH_2$ and LiH, respectively. The iron peak in pattern a is due to residual iron in the starting materials for the positive electrode. The inserted electrochemical curve shows the evolution of potential V (vs. Li$^+$/Li, in volts) as a function of x.

FIG. 3 confirms the presence of $MgH_2$ (as β and γ) in the starting electrode material, the formation of LiH and Mg during the 1$^{st}$ discharge, and β-$MgH_2$ forming during the 1$^{st}$ charge.

Hydrogen Desorption

The material, obtained on the positive electrode of the electrochemical cell after the $1^{st}$ charge (FIGS. 3c and 4c), was recovered and submitted to a thermal treatment at 200° C. under primary vacuum during 5 hours (FIG. 4c')

Figure 4:
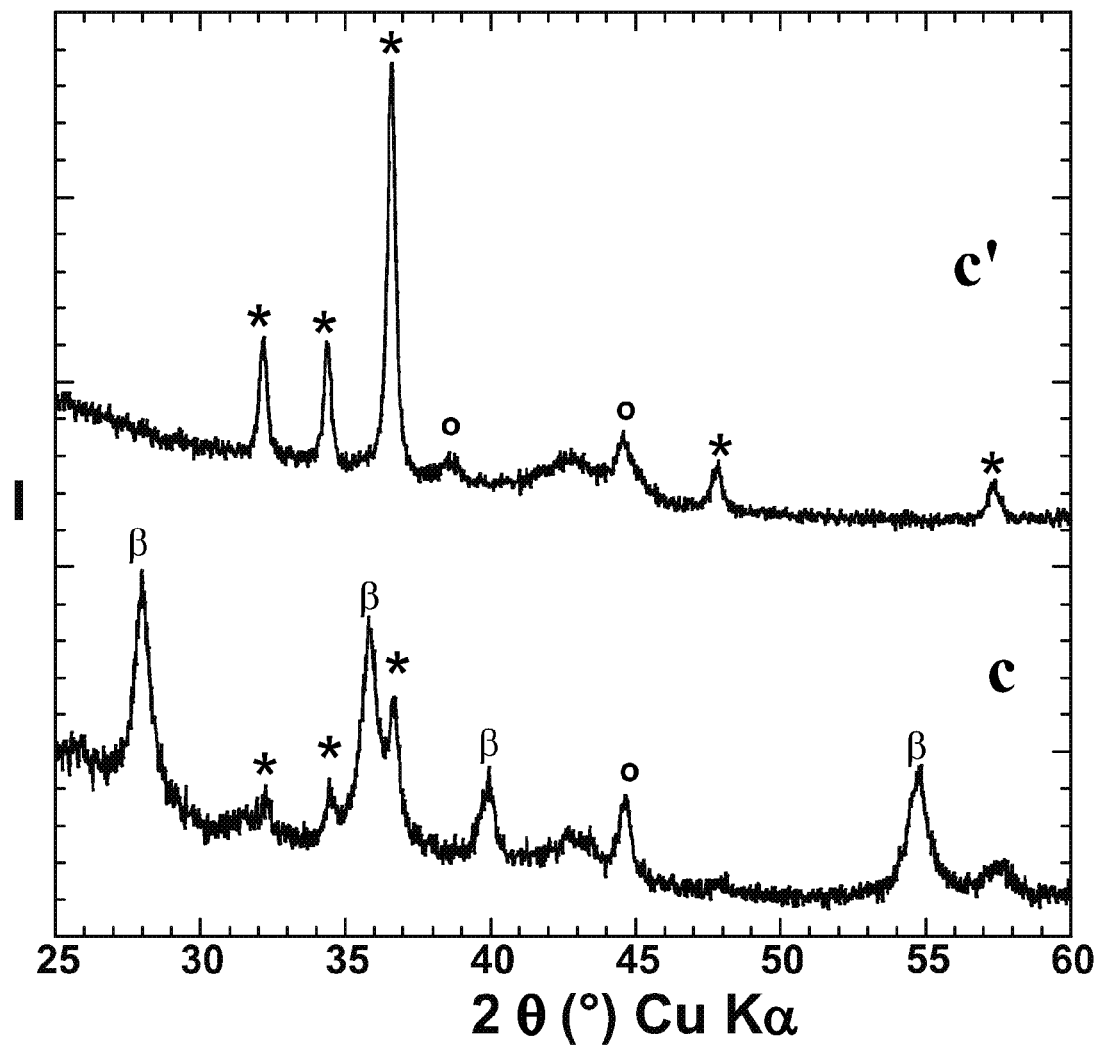
FIG. 4 represents the X ray diffraction patterns obtained before (pattern c) and after (pattern c') hydrogen desorption in Example 2 by the MgH$_2$ nanometric particles. XRD pattern c' shows mainly the X ray diffraction peaks of Mg, the diffraction peaks of MgH$_2$ are not detected, which is in good agreement with a complete desorption.

FIG. 4 represents the X-ray diffraction patterns obtained before (c) and after (c') hydrogen desorption by the $MgH_2$ nanometric particles. Pattern 4c' shows mainly the X ray diffraction peaks of Mg. The diffraction peaks of $MgH_2$ are not detected which is in good agreement with a complete desorption of hydrogen.

Hydrogen Absorption

The hydrogen-poor material as obtained was subjected to a thermal treatment at 150° C. under a hydrogen pressure of 10 bars for 1 hour leading to the complete formation of $MgH_2$.

EXAMPLE 3

A stoichiometric mixture of $MgH_2+2$ Li was ground in a SPEX model 8000, for one hour. The result was an Mg+2 LiH powder.

An electrochemical cell was built, in which the positive electrode consisted of the mixture of Mg powder+2 LiH containing 10% by weight of C, compacted on a Ni disk. The electrolyte was a 1M solution of $LiPF_6$ in a ethyl carbonate/dimethyl carbonate mixture (50/50 by volume). The negative electrode was made of Li metal on a Ni disk.

A direct current was passed through the cell at a level of C/10 for a time to transform all of Mg into $MgH_2$. Then the nanometric powder was recovered. It consisted of the mixture $MgH_2+C$ having 10% in weight of carbon.

This powder underwent a thermal treatment at 200° C. under primary vacuum for 5 hours and an Mg powder containing 10% in weight of C was obtained. This powder was suitable for use to absorb hydrogen, according to the operating mode from example 1, in a hydrogen storage process.

EXAMPLE 4

Preparation of Ti Nanometric Particles

An electrochemical cell was built, in which the positive electrode was made of a $TiH_2+C$ mixture containing 10% in weight of C, compacted on a Ni disk. The electrolyte was a 1M solution of $LiPF_6$ in a ethyl carbonate/dimethyl carbonate mixture (50/50 vol). The negative electrode was made of Li metal compacted on a Ni disk.

The cell obtained was submitted to a discharge direct current which decreases the potential from 1.5V to 5 mV, in order to obtain x=2 in the following reaction $TiH_2+xLi^++xe^-\rightarrow xLiH+(x/2)Ti+[1-(x/m)]TiH_2$, that is to say at $TiH_2+2Li^++2e^-\rightarrow 2LiH+Ti$. The titanium produced was in the form of a nanometric powder.

Figure 5:
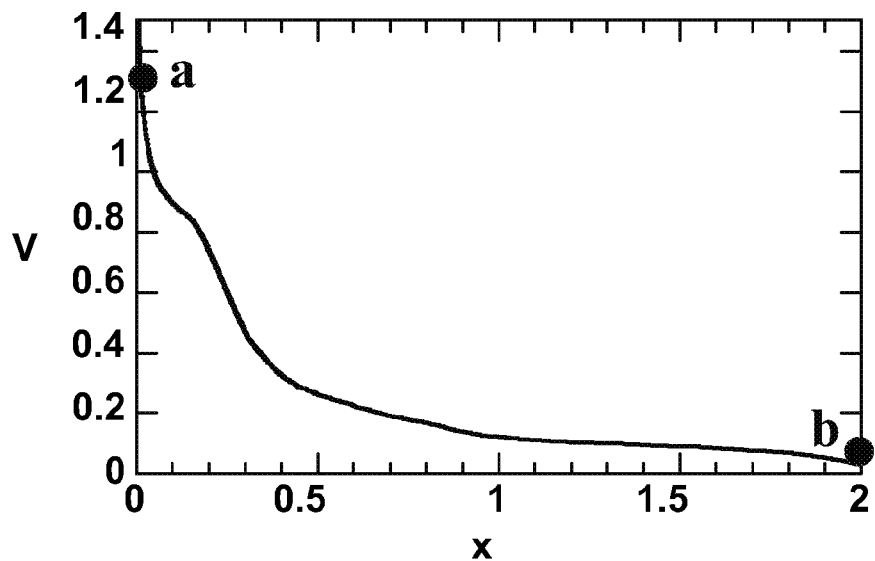
FIG. 5 presents the variation of potential V (vs. Li$^+$/Li, in volts) versus conversion of TiH$_2$, x, during discharge in Example 4.

FIG. 5 represents the variation of potential V (vs. $Li^+/Li$, in Volts) during discharge. It shows that, when a discharge current is applied, the potential abruptly decreases from about 1.5 V to 100 mV, and then slowly decreases down to the cut-off at 5 mV, when x has reached its value, namely 2.

Figure 6:
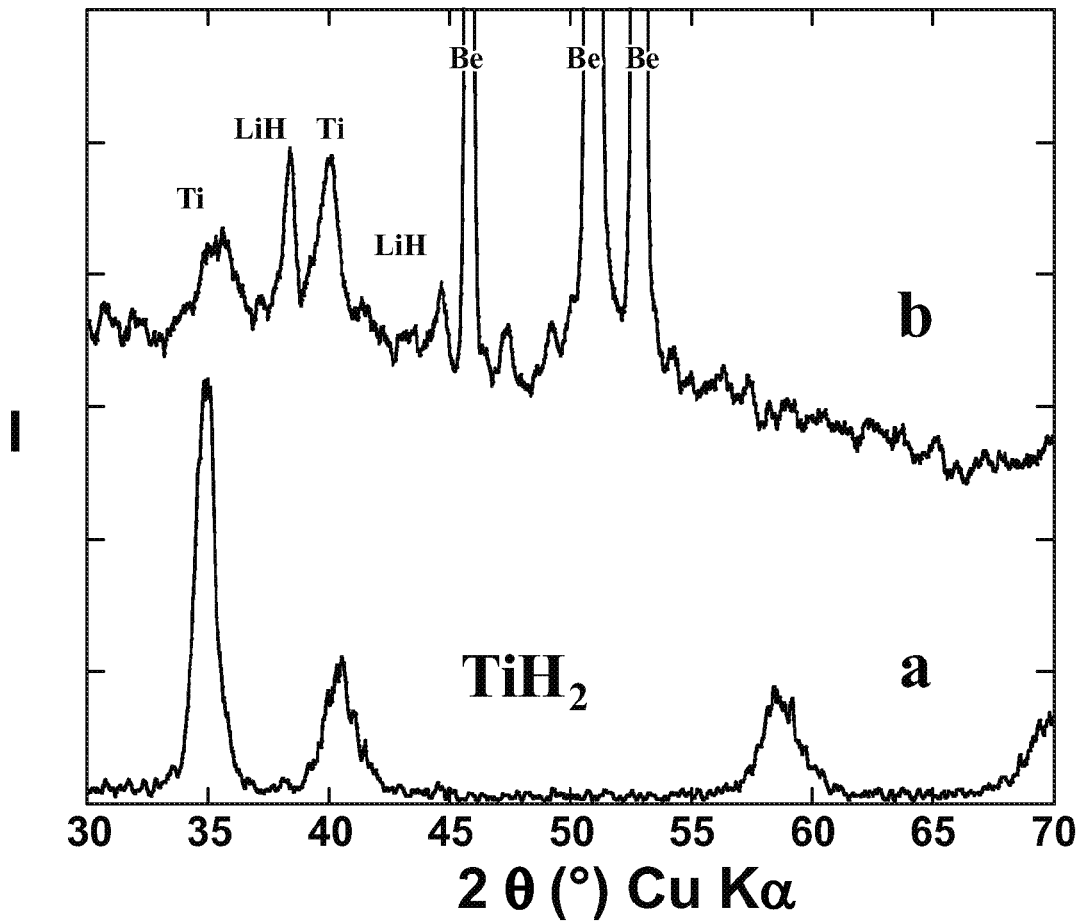
FIG. 6 presents the XRD patterns of initial TiH$_2$ (a) and of the material obtained at x=2 (b) in Example 4.

FIG. 6 represents the XRD patterns of initial $TiH_2$ (a) and of the material obtained at x=2 (b). These diagrams confirm the formation of metallic titanium via the aforementioned conversion electrochemical reaction. XR diffraction analysis was performed in a cell equipped with a beryllium (Be) window to prevent air exposure. The peaks denoted Be on FIG. 6 correspond to the beryllium window.

Hydrogen Absorption on Nanometric Titanium Particles.

The Ti powder obtained was submitted to a thermal treatment at 200° C. under a hydrogen pressure of 2 bars during 2 hours.

Figure 7:
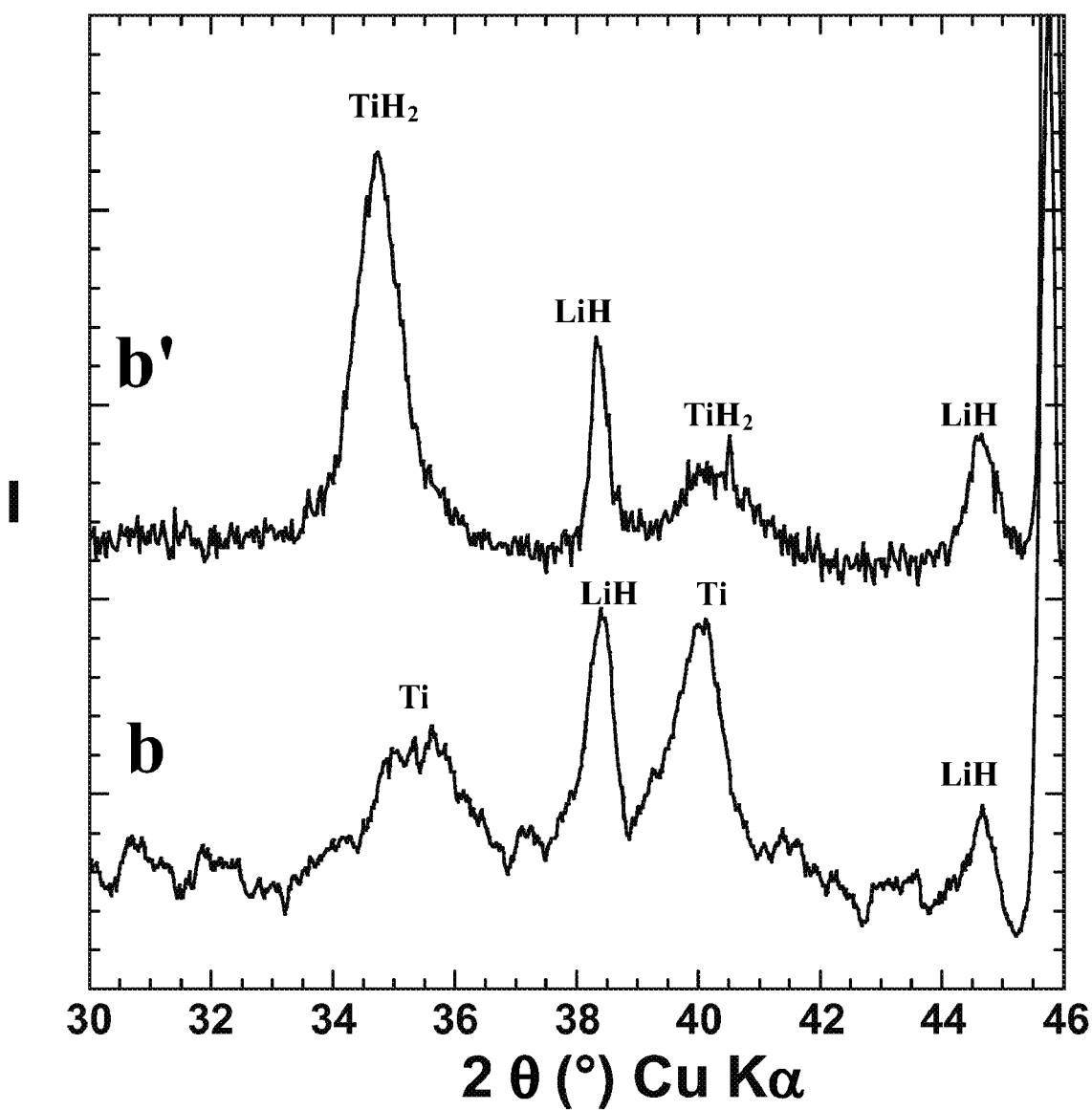
FIG. 7 shows the X ray diffraction pattern before (b) and after absorption (b'). XRD pattern b' confirms the formation of TiH$_2$ in Example 4.

FIG. 7 shows the X ray diffraction pattern before (b) and after absorption (b'). FIG. 7 b' confirms the formation of $TiH_2$.

EXAMPLE 5

Preparation of Na Nanometric Particles

An electrochemical cell was built, in which the positive electrode was made of the mixture NaH+C containing 10% in weight of C, compacted on a Ni disk. The electrolyte was a 1M solution of $LiPF_6$ in a ethyl carbonate/dimethyl carbonate mixture (50/50 in vol). The negative electrode is made of metal Li on a Ni disk.

The cell was subjected to a discharge direct current which decreases the potential from 1.5 V to 5 mV, in order to obtain x=0.9 in the following reaction

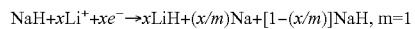

$NaH+xLi^++xe^-\rightarrow xLiH+(x/m)Na+[1-(x/m)]NaH, m=1$

Na was obtained in the form of a nanometric powder.

Figure 8:
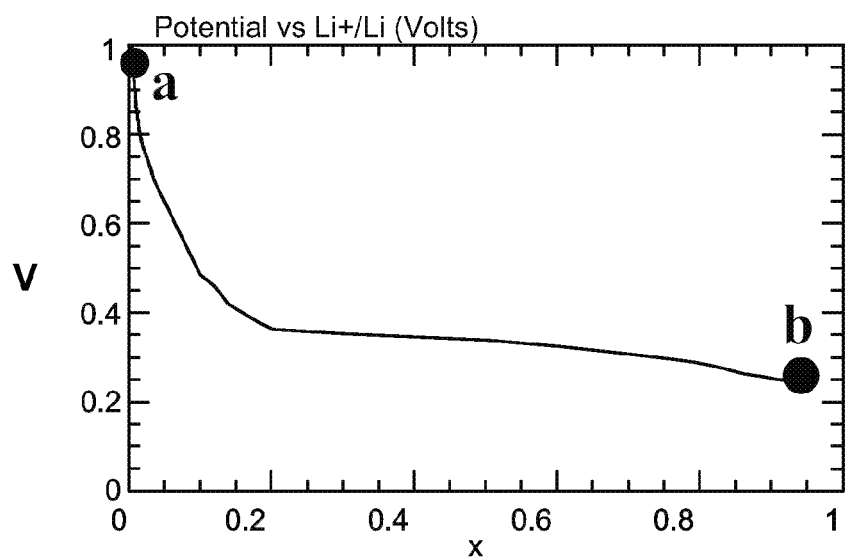
FIG. 8 presents the voltage data for NaH precursor material in Example 5 as the infused lithium content increases from x=0 (a) to x=nearly 1 (b) at voltages averaging about 370 mV and further down to the cut off voltage of 5 mV.

FIG. 8 represents the voltage data for NaH precursor material as the infused lithium content increases from x=0 to x=nearly 1 at voltages averaging about 370 mV and further down to the cut off voltage of 5 mV.

Figure 9:
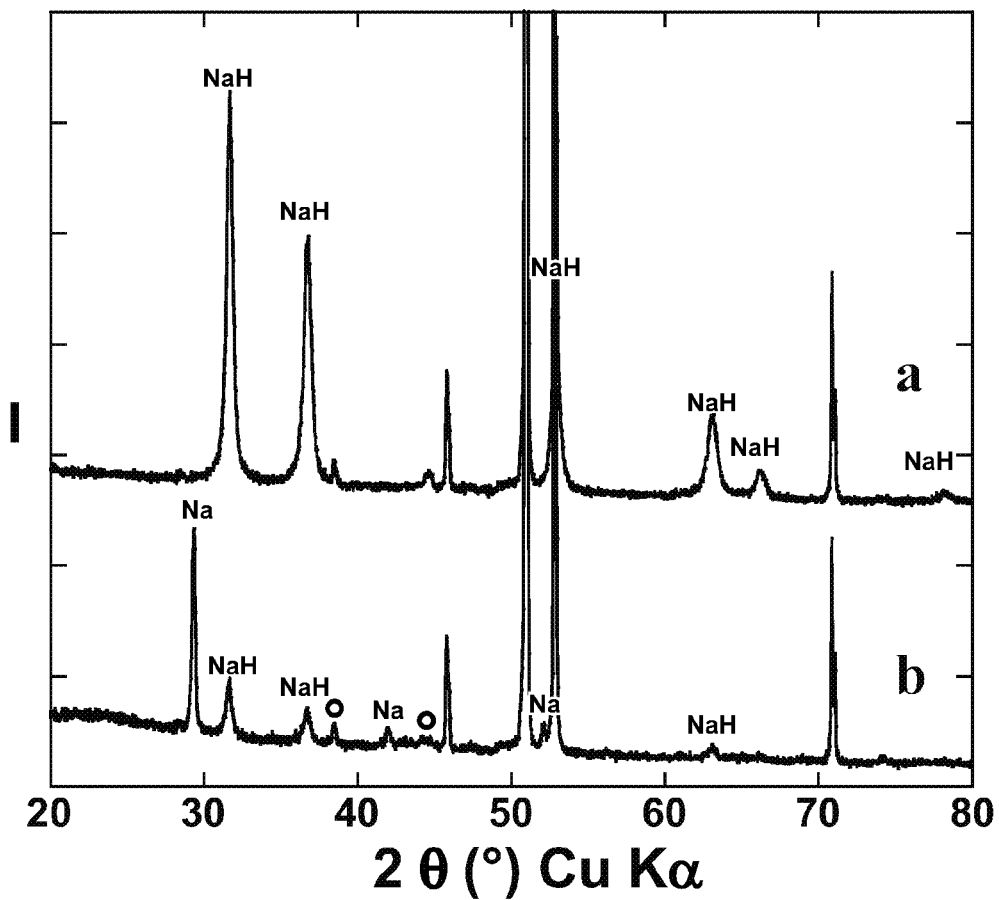
FIG. 9 represents the XRD patterns of the electrode material in Example 5 before discharge (pattern a) and after discharge (pattern b).

FIG. 9 represents the XRD patterns of the electrode material before discharge (a) and after discharge (b).

This powder may then be used to absorb hydrogen, according to the method according to example 1, in a hydrogen storage process.

Practices of the invention have been described by several illustrative embodiments. However, the scope of the invention is not limited to these embodiments.

The invention claimed is:

1. A method of forming nanometer-size particles of a hydride forming material, M, or its hydrogen-containing complement, MHm, where m is the number of hydrogen atoms per formula unit and where MHm has an enthalpy of formation, the method comprising:
    forming a first electrode of an electrolytic cell in which the active electrode material comprises a chemical equivalent excess of either MHm or M in the form of particles that are larger than nanometer-size;
    forming a second electrode in which the active material is R which is capable of forming a hydride RHr, where r is the number of hydrogen atoms per formula unit, and RHr has a lower enthalpy of formation than MHm;
    forming a liquid electrolyte in electrochemical connection with the first and second electrodes and containing $R^{+r}$ ions; and
    where MHm is in excess with respect to M, electrolytically reducing MHm with $R^{+r}$ ions to form nanometer-size particles of M, and RHr, in the first electrode material; or
    where M is in excess with respect to MHm, electrolytically oxidizing M to form nanometer-size particles of MHm with RHr in the first electrode material; and, thereafter
    using nanometer-size particles of M and MHm as hydrogen storage materials by sequentially absorbing hydrogen into M particles and releasing hydrogen from MHm particles.

2. A method of forming particles as recited in claim 1 in which a mixture of M particles and RHr in the first electrode are further processed electrolytically by a reversal of cell polarity to form nanometer-size particles of MHm and to remove at least some R from the first electrode.

3. A method of forming particles as recited in claim 1 in which M comprises at least one of an alkali metal, an alkaline earth metal, a group IIIA element, a group IVA element, or a group VA element.

4. A method of forming particles as recited in claim 1 in which lithium ions are used as the reductant, R, for the formation of MHm nanometer particles, or LiH is used in the first electrode with M for formation of nanometer particles of MHm.

5. A method of forming particles as recited in claim 1 in which MHm or M is mixed with an electrically conductive material in the preparation of first electrode material for cell operation.

6. A method of forming particles as recited in claim 5 in which MHm or M is mixed with electrically conductive carbon particles in the preparation of first electrode material for cell operation.

7. A method of forming particles as recited in claim 1 in which first electrode material comprises a polymer binder.

8. A method of forming particles as recited in claim 1 in which M comprises one or more elements selected from the group consisting of calcium, cesium, magnesium, sodium, titanium, yttrium, and zirconium.

9. A method of forming particles as recited in claim 1 in which M comprises one or more intermetallic compounds selected from the group consisting of $Mg_2Ni$, $Mg_2Co$, $Zr_2Fe$, $TiNi$, $TiFe$, $ZrNi$, $LaNi_2$, $YNi_2$, $YMn_2$, $ZrCr_2$, $ZrMn_2$, $ZrV_2$, $TiMn_2$, $MnCo_3$, $YNi_3$, $LaMg_2Ni_9$, $LaNi_5$, $LaCo_5$, $LaCu_5$, and $LaPt_5$.

10. A method of forming nanometer-size particles of a hydride forming material, M, or its hydrogen-containing complement, MHm, where m is the number of hydrogen atoms per formula unit, the method comprising:
    forming a first electrode of an electrolytic cell in which the active electrode material comprises MHm in the form of particles that are larger than nanometer-size;
    forming a second electrode in which the active material is Li;
    forming a liquid electrolyte in electrochemical connection with the first and second electrodes and containing $Li^{+1}$ ions;
    electrolytically reducing at least a major portion of the MHm particles with $Li^{+1}$ ions to form nanometer-size particles of M, and LiH, in the first electrode material; and, thereafter
    using nanometer-size particles of MHm and M as hydrogen storage materials by sequentially absorbing hydrogen into M particles and releasing hydrogen from MHm particles.

11. A method of forming particles as recited in claim 10 further comprising separating nanometer-size particles of M from the first electrode material for use as hydrogen storage material.

12. A method of forming particles as recited in claim 10 in which M comprises at least one of an alkali metal, an alkaline earth metal, a group IIIA element, a group IVA element, or a group VA element.

13. A method of forming particles as recited in claim 10 in which MHm is mixed with an electrically conductive material in the preparation of first electrode material for cell operation.

14. A method of forming particles as recited in claim 13 in which MHm is mixed with electrically conductive carbon particles in the preparation of first electrode material for cell operation.

15. A method of forming particles as recited in claim 10 in which first electrode material comprises a polymer binder.

16. A method of forming nanometer-size particles of a hydride forming material, M, or its hydrogen-containing complement, MHm, where m is the number of hydrogen atoms per formula unit, the method comprising:
    forming a first electrode of an electrolytic cell in which the active electrode material comprises M in the form of particles that are larger than nanometer-size, and LiH;
    forming a second electrode in which the active material is Li;
    forming a liquid electrolyte in electrochemical connection with the first and second electrodes and containing $Li^{+1}$ ions;
    electrolytically oxidizing at least a major portion of the M particles with LiH in the first electrode material to form nanometer-size particles of MHm; and, thereafter
    using nanometer-size particles of M and MHm as hydrogen storage materials by sequentially absorbing hydrogen into M particles and releasing hydrogen from MHm particles.

17. A method of forming particles as recited in claim 16 further comprising separating nanometer-size particles of MHm from the first electrode material for use as hydrogen storage material.

18. A method of forming particles as recited in claim 16 in which M comprises at least one of an alkali metal, an alkaline earth metal, a group IIIA element, a group IVA element, or a group VA element.

19. A method of forming particles as recited in claim 10 in which M comprises at least one of an alkali metal, an alkaline earth metal, a group IIIA element, a group IVA element, or a group VA element.

20. A method of forming particles as recited in claim 16 in which first electrode material comprises a polymer binder.

* * * * *